US007787035B2

(12) United States Patent
Chen et al.

(10) Patent No.: US 7,787,035 B2
(45) Date of Patent: Aug. 31, 2010

(54) IMAGE ACQUIRING APPARATUS AND IMAGE PROCESSING METHOD THEREOF

(75) Inventors: Chun-Yu Chen, Taipei (TW); Chih-Shih Yu, Hsinchu (TW)

(73) Assignee: Alpha Imaging Technology Corp., Jhubei, Hsinchu County (TW)

( * ) Notice: Subject to any disclaimer, the term of this patent is extended or adjusted under 35 U.S.C. 154(b) by 973 days.

(21) Appl. No.: 11/550,815

(22) Filed: Oct. 19, 2006

(65) Prior Publication Data

US 2007/0092157 A1 Apr. 26, 2007

(30) Foreign Application Priority Data

Oct. 20, 2005 (TW) .............................. 94136728 A

(51) Int. Cl.
*H04N 9/64* (2006.01)
*H04N 5/208* (2006.01)
*H04N 5/202* (2006.01)

(52) U.S. Cl. ........................ 348/251; 348/252; 348/254

(58) Field of Classification Search ....................... None
See application file for complete search history.

(56) References Cited

U.S. PATENT DOCUMENTS

2004/0233305 A1* 11/2004 Morishita ................... 348/245
2005/0013505 A1* 1/2005 Nishimura et al. .......... 382/274

* cited by examiner

*Primary Examiner*—Lin Ye
*Assistant Examiner*—Euel K Cowan
(74) *Attorney, Agent, or Firm*—Thomas, Kayden, Horstemeyer & Risley

(57) ABSTRACT

An image acquiring apparatus and an image processing method thereof. First, the apparatus acquires an image including at least one pixel corresponding to image data. A location of the at least one pixel of the image is represented by an actual coordinate. Next, the apparatus proceeds the stray processing according to the actual coordinate and generates a virtual compensation parameter. Then, the apparatus adjusts the image data into adjusted image data according to the virtual compensation parameter. Finally, the apparatus displays the image according to the adjusted image data.

16 Claims, 3 Drawing Sheets

200

202

206 Optical module → 208 Sensor → I → 204 Image processor

IMAGE ACQUIRING APPARATUS AND IMAGE PROCESSING METHOD THEREOF

This application claims the benefit of Taiwan application Serial No. 94136728, filed Oct. 20, 2005, the subject matter of which is incorporated herein by reference.

BACKGROUND OF THE INVENTION

1. Field of the Invention

The invention relates in general to an image acquiring apparatus and an image processing method thereof, and more particularly to an image acquiring apparatus having a stray device and an image processing method thereof.

2. Description of the Related Art

The quality of a display frame generated by a conventional image acquiring apparatus, such as a digital camera or a digital camcorder, depends on a lens or a sensor in the digital camera or the digital camcorder. The sensor is, for example, a charge coupled device (CCD). The digital camera or digital camcorder may have the regional differences at different locations of the pixels of the display frame due to the nonuniform light reflection level of the lens or the nonuniform light sensing ability of the sensor. For example, when the image acquiring apparatus is acquiring a white sheet, it is found that the frame brightness is higher as the display frame is closer to the optical center region, and the frame brightness is darker as the display frame is farther from the optical center region. Alternatively, the frame is closer to red as it closer to the optical center region, and is closer to green as it is farther from the optical center region. In order to overcome the above-mentioned regional differences, the conventional image acquiring apparatus adopts different compensations according to the display frames in different regions so as to overcome the problem of the nonuniform light reflection level of the lens or the nonuniform light sensing ability of the sensor.

However, when the pixels of the display frame pertain to the same region, the image acquiring apparatus proceeds the same compensation for the pixels in the same region. When the pixels of the display frame pertain to different regions, the image acquiring apparatus proceeds different compensations for the pixels in the different regions. Due to the difference in the spatial relationship, the discontinuity of compensation is caused, and the man-made defect after compensation is formed. Thus, an extremely sharp boundary line image for the human vision is formed between two adjacent regions due to the color or brightness drop.

SUMMARY OF THE INVENTION

It is therefore an object of the invention to provides an image acquiring apparatus and an image processing method thereof, wherein the apparatus has a stray device for generating a random number randomly such the image data of each pixel is adjusted according to a virtual compensation parameter. Thus, the spatial relationship of the image is slightly broken, and the man-made defect generated due to the prior art, discontinuity of compensation may be improved.

The invention achieves the above-identified object by providing an image processing method, which includes the steps of: acquiring an image, which includes at least one pixel corresponding to image data, wherein a location of the at least one pixel of the image is represented by an actual coordinate; proceeding the stray processing according to the actual coordinate to obtain a virtual compensation parameter; adjusting the image data into adjusted image data according to the virtual compensation parameter; and displaying the image according to the adjusted image data.

The invention also achieves the above-identified object by providing an image acquiring apparatus including an image acquiring unit and an image processor. The image acquiring unit acquires an image, which comprises at least one pixel corresponding to image data, and a location of the at least one pixel of the image is represented by an actual coordinate. The image processor includes a stray device, a compensation parameter generator and an image processing unit. The stray device proceeds the stray processing to obtain a virtual coordinate according to the actual coordinate. The compensation parameter generator receives the virtual coordinate and thus outputs a virtual compensation parameter. The image processing unit adjusts the image data according to the virtual compensation parameter.

The invention also achieves the above-identified object by providing an image acquiring apparatus including an image acquiring unit and an image processor. The image acquiring unit acquires an image, which comprises at least one pixel corresponding to image data, and a location of the at least one pixel of the image is represented by an actual coordinate. The image processor includes a compensation parameter generator, a stray device and an image processing unit. The compensation parameter generator receives the actual coordinate and thus outputs a compensation parameter. The stray device proceeds the stray processing according to the compensation parameter and thus obtains a virtual compensation parameter. The image processing unit adjusts the image data according to the virtual compensation parameter.

Other objects, features, and advantages of the invention will become apparent from the following detailed description of the preferred but non-limiting embodiments. The following description is made with reference to the accompanying drawings.

DETAILED DESCRIPTION OF THE INVENTION

In order to prevent the prior art discontinuity of compensation from forming the man-made defect after compensation, the following embodiments utilize a stray device to generate a random number randomly to slight break the spatial relationship of the original image such that the compensated image frame becomes more lifelike and natural.

Figure 1:
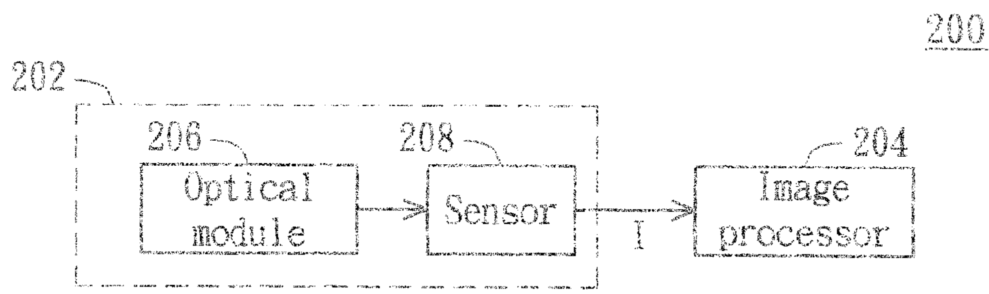
FIG. 1 is a block diagram showing an image acquiring apparatus according to a preferred embodiment of the invention.

FIG. 1 is a block diagram showing an image acquiring apparatus 200 according to a preferred embodiment of the invention. The image acquiring apparatus 200 includes an image acquiring unit 202 and an image processor 204. The image acquiring unit 202 acquires an image I. The image I is composed of a plurality of pixels each corresponding to image data and to an actual coordinate. The image acquiring unit 202 includes, for example, an optical module 206 and a sensor 208. The optical module 206 includes imaging devices such as a lens, a stop and a shutter, which are not illustrated in FIG. 2. The sensor 208 is, for example, a charge coupled device for receiving a light source outputted from the optical module 206 and converting the light source into the image I and outputting the image I to the image processor 204.

Figure 2:
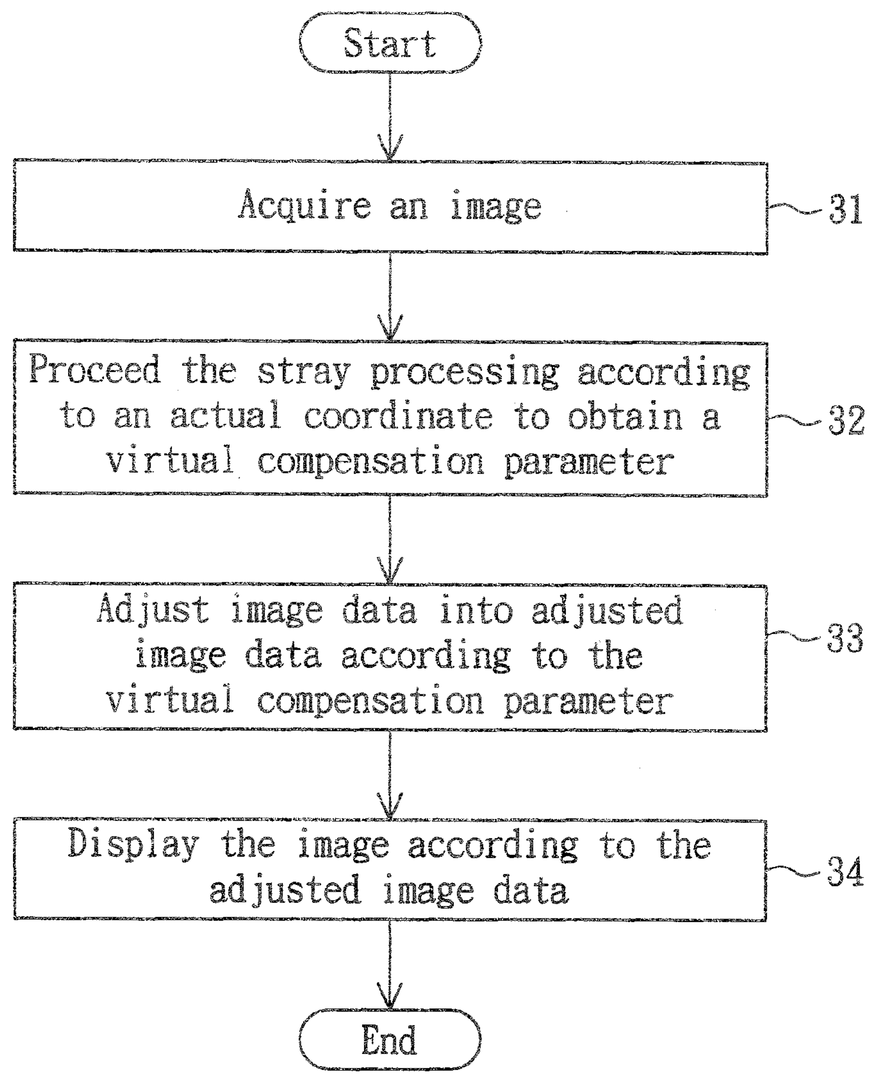
FIG. 2 is a flow chart showing an image acquiring method according to another preferred embodiment of the invention.

FIG. 2 is a flow chart showing an image acquiring method according to another preferred embodiment of the invention, which is applied to the image acquiring apparatus 200. The image processing method includes the following steps. First, the image acquiring unit 202 acquires an image, as shown in step 31. Next, a virtual compensation parameter is obtained by proceeding the stray processing according to an actual coordinate, as shown in step 32. Then, the image data is adjusted into adjusted image data according to the virtual compensation parameter, as shown in step 33. Finally, the image processor 204 displays the image according to the adjusted image data, as shown in step 34.

Figure 3:
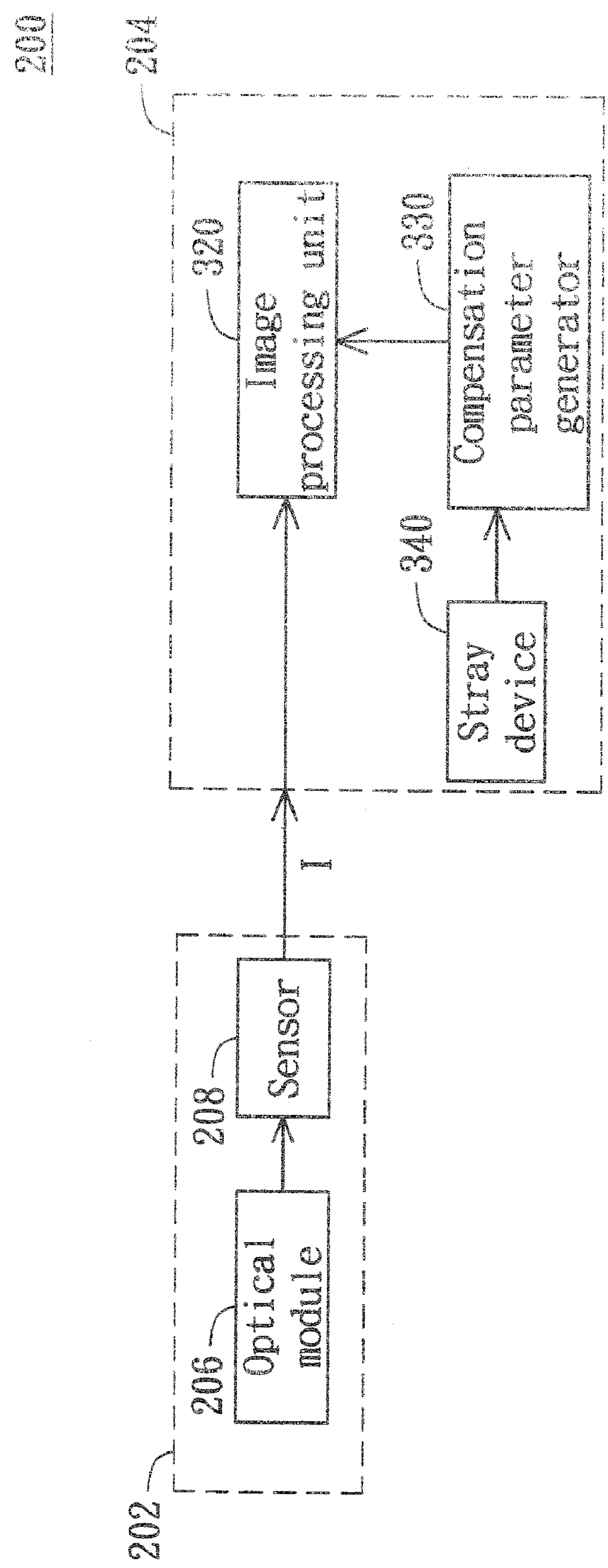
FIG. 3 is a block diagram showing an example of an image processor.

FIG. 3 is a block diagram showing an example of the image processor 204. Referring to FIG. 3, the image processor 204 further includes a stray device 340, a compensation parameter generator 330 and an image processing unit 320. The image processing unit 320 adjusts the image data of each pixel according to the distance from each pixel to an image reference point, for example. The image reference point is, for example, a point on the image I corresponding to an optical center point of the lens.

The stray device 340 proceeds the stray processing according to the actual coordinate to obtain a virtual coordinate. The stray processing generates the virtual coordinate by, for example, adding a coordinate variable to the actual coordinate or subtracting the coordinate variable from the actual coordinate. The stray device 340 outputs the virtual coordinate to the compensation parameter generator 330. The transversal coordinate (X) and the longitudinal coordinate (Y) of the coordinate variable are respectively a transversal coordinate random number and a longitudinal coordinate random number generated by the stray device 340 randomly.

The compensation parameter generator 330 calculates the distance from the virtual coordinate of each pixel to the optical center point, and thus generates and outputs the virtual compensation parameter to the image processing unit 320. The virtual compensation parameter is the virtual distance from the virtual coordinate to the optical center point. The image processing unit 320 correspondingly adjusts the image data of the pixel according to the virtual compensation parameter.

Figure 4:
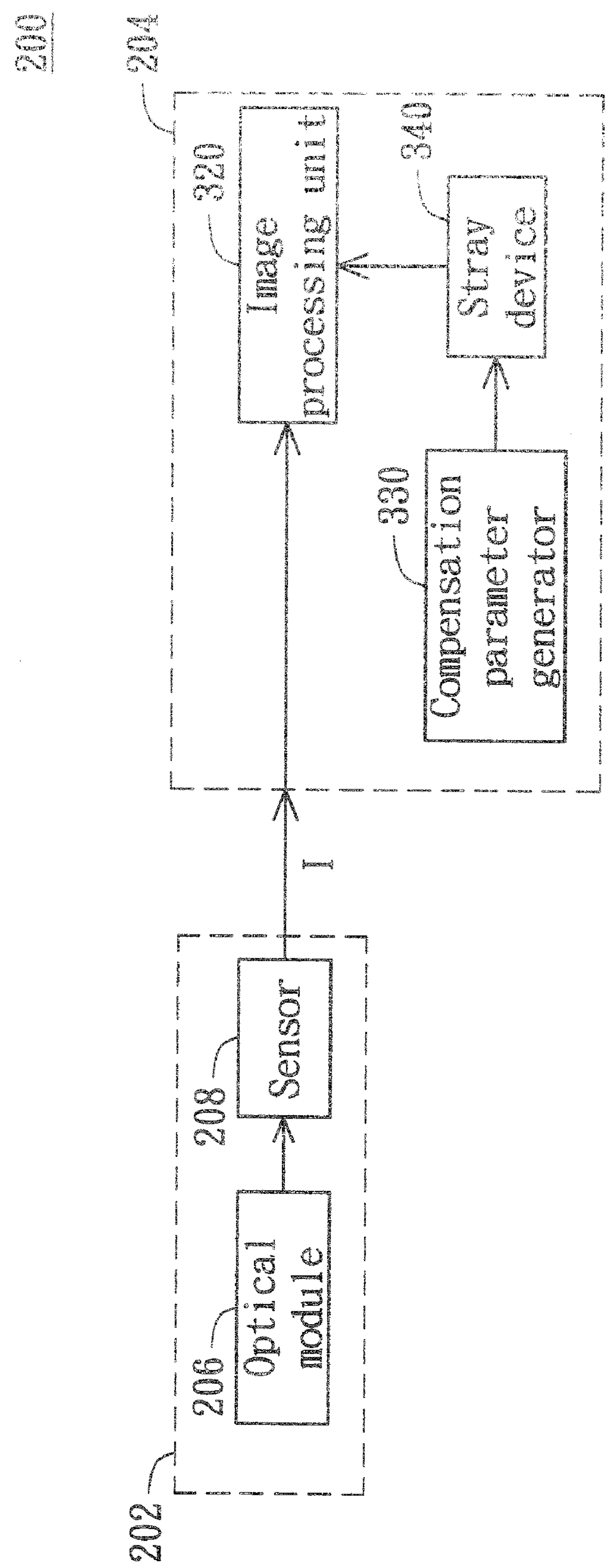
FIG. 4 is a block diagram showing another example at the image processor.

FIG. 4 is a block diagram showing another example of the image processor. In addition to converting the virtual coordinate generated by the stray device 340 into the virtual distance to be outputted to the image processing unit 320, the compensation parameter generator 330 may also receive the actual coordinate of the pixel and thus generate and output the compensation parameter to the stray device 340, which proceeds the stray processing and then outputs the virtual compensation parameter to the image processing unit 320. The compensation parameter generator 330 calculates the compensation parameter between each pixel and the optical center according to the actual coordinate of each pixel on the image I, and the compensation parameter is the actual distance between the pixel and the optical center.

The stray device 340 proceeds the stray processing according to the compensation parameter and then generates and outputs the virtual compensation parameter to the image processing unit 320. The virtual compensation parameter is the virtual distance from the pixel to the optical center. The stray processing is to, for example, add the corresponding distance variable to the actual distance or subtract the corresponding distance variable from the actual distance and thus obtain the virtual distance. The distance variable is the distance random number generated by the stray device 340 randomly. The image processing unit 320 adjusts the image data of each pixel according to the slightly adjusted virtual distance.

Thus, the image acquiring apparatus 200 can improve the man-made defect caused by the discontinuity of compensation by utilizing the stray device 340 to either slightly adjust the actual coordinate inputted to the compensation parameter generator 330, or to slightly adjust the actual distance outputted by the compensation parameter generator 330 after calculation.

In addition, the invention is not particularly limited to the above-mentioned embodiments but includes the method of proceeding different region compensations according to the actual coordinates of the pixels by the image processing unit. For example, different region compensations may be proceeded on the pixels of the frame from left to right, or different region compensations may be proceeded on the odd numbered pixels and even numbered pixels of the frame. Thus, the invention can improve the man-made defect caused by the discontinuity of compensation, and the image frame becomes more lifelike and natural.

The image acquiring apparatus and the image acquiring method according to the embodiments of the invention utilize a stray device to generate a variable randomly, and slightly shift the actual coordinate of each pixel or the actual distance such that the compensated image has the better display quality.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image acquiring apparatus, comprising:

an image acquiring unit for acquiring an image, which comprises a plurality of pixels each corresponding to a piece of image data, wherein a location of each of the pixels is represented by an actual coordinate; and an image processor, which comprises:

a stray device for shifting the actual coordinate corresponding to each of the pixels by a random coordinate variable to obtain a virtual coordinate corresponding to each of the pixels;

a compensation parameter generator for receiving the virtual coordinates and thus outputting a virtual compensation parameter corresponding to each of the pixels; and an image processing unit for adjusting the image data of each of the pixels according to the corresponding virtual compensation parameter.

2. The apparatus according to claim 1, wherein the virtual compensation parameter is a virtual distance, which is obtained when the compensation parameter generator calculates a distance from the virtual coordinate to an image reference point of the image.

3. The apparatus according to claim 2, wherein the image acquiring unit has a lens, which has an optical center point corresponding to the image reference point on the image.

4. The apparatus according to claim 1, wherein the stray device adds the corresponding random coordinate variable to the actual coordinate corresponding to each of the pixels or subtract the corresponding random coordinate variable from the actual coordinate corresponding to each of the pixels to obtain the virtual coordinate corresponding to each of the pixels, each of the random coordinate variables comprises a transversal coordinate random number and a longitudinal coordinate random number, both of which are generated randomly by the stray device.

5. An image acquiring apparatus, comprising:

an image acquiring unit for acquiring an image, which comprises a plurality of pixels each corresponding to a piece of image data, wherein a location of each of the pixels is represented by an actual coordinate; and an image processor, which comprises:

a compensation parameter generator for receiving the actual coordinates and thus outputting a compensation parameter corresponding to each of the pixels;

a stray device for shifting the compensation parameter corresponding to each of the pixels by a random variable and thus obtaining a virtual compensation parameter corresponding to each of the pixels; and an image processing unit for adjusting the image data of each of the pixels according to the corresponding virtual compensation parameter.

6. The apparatus according to claim 5, wherein the compensation parameter is an actual distance, which is obtained when the compensation parameter generator computes a distance from the actual coordinate to an image reference point of the image.

7. The apparatus according to claim 5, wherein the virtual compensation parameter is a virtual distance.

8. The apparatus according to claim 6, wherein the image acquiring unit has a lens, which has an optical center point corresponding to the image reference point on the image.

9. The apparatus according to claim 6, wherein the stray device adds the corresponding random variable to the actual distance corresponding to each of the pixels or subtract the corresponding random variable from the actual distance corresponding to each of the pixels, each of the random variables is a distance random number generated by the stray device randomly.

10. An image processing method, comprising the steps of:

acquiring an image, which comprises a plurality of pixels each corresponding to a piece of image data, wherein a location of each of the pixels is represented by an actual coordinate;

shifting the actual coordinate corresponding to each of the pixels by a random coordinate variable to obtain a virtual coordinate corresponding to each of the pixels and obtaining a virtual compensation parameter corresponding to each of the pixels according to the virtual coordinates;

adjusting the image data of each of the pixels into adjusted image data according to the virtual corresponding compensation parameter; and displaying the image according to the adjusted image data.

11. The method according to claim 10, wherein the step of shifting the actual coordinate corresponding to each of the pixels by a random coordinate variable comprises the sub-steps of:

adding the corresponding random coordinate variable to the actual coordinate corresponding to each of the pixels or subtracting the corresponding random coordinate variable from the actual coordinate corresponding to each of the pixels to obtain the virtual coordinate corresponding to each of the pixels; and calculating a distance from the virtual coordinate corresponding to each of the pixels to an image reference point to serve as the virtual compensation parameter corresponding to each of the pixels.

12. The method according to claim 11, wherein the step of acquiring the image is proceeded by an image acquiring unit, which has a lens and an optical sensor, the optical sensor receives a light source through the lens and converts the light source into the image, and an optical center point of the lens corresponds to the image reference point on the image.

13. An image processing method, comprising the steps of:

acquiring an image, which comprises a plurality of pixels each corresponding to a piece of image data, wherein a location of each of the pixels is represented by an actual coordinate;

receiving the actual coordinates and thus outputting a compensation parameter corresponding to each of the pixels;

shifting the compensation parameter corresponding to each of the pixels by a random variable to obtain a virtual compensation parameter corresponding to each of the pixels;

adjusting the image data of each of the pixels into adjusted image data according to the virtual corresponding compensation parameter; and displaying the image according to the adjusted image data.

14. The method according to claim 13, wherein the step of acquiring the image is proceeded by an image acquiring unit, which has a lens and an optical sensor, the optical sensor receives a light source through the lens and converts the light source into the image, and an optical center point of the lens corresponds to the image reference point on the image.

15. The method according to claim 13, wherein the step of receiving the actual coordinates and thus outputting a compensation parameter corresponding to each of the pixels further comprises obtaining the compensation parameter corresponding to each of the pixels by computing an actual distance from the actual coordinate corresponding to each of the pixels to an image reference point of the image.

16. The method according to claim 15, wherein the step of shifting the compensation parameter corresponding to each of the pixels by a random variable further comprises:

adding the corresponding random variable to the actual distance corresponding to each of the pixels or subtracting the corresponding random variable from the actual distance corresponding to each of the pixels to obtain the virtual compensation parameter corresponding to each of the pixels.

* * * * *